United States Patent
Barari et al.

(10) Patent No.: US 10,424,288 B2
(45) Date of Patent: Sep. 24, 2019

(54) SYSTEM AND METHOD FOR RENDERING TEXTUAL MESSAGES USING CUSTOMIZED NATURAL VOICE

(71) Applicant: Wipro Limited, Bangalore (IN)

(72) Inventors: Adrita Barari, Kolkata (IN); Ghulam Mohiuddin Khan, Bangalore (IN); Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 251 days.

(21) Appl. No.: 15/604,002

(22) Filed: May 24, 2017

(65) Prior Publication Data

US 2018/0286383 A1 Oct. 4, 2018

(30) Foreign Application Priority Data

Mar. 31, 2017 (IN) .............................. 201741011632

(51) Int. Cl.
- *G10L 13/08* (2013.01)
- *G06F 17/27* (2006.01)
- *G10L 13/033* (2013.01)

(52) U.S. Cl.
CPC .......... *G10L 13/08* (2013.01); *G06F 17/2785* (2013.01); *G10L 13/033* (2013.01)

(58) Field of Classification Search
None
See application file for complete search history.

(56) References Cited

U.S. PATENT DOCUMENTS

| 5,860,064 A * | 1/1999 | Henton ................. G10L 13/033 204/266 |
| 5,918,222 A * | 6/1999 | Fukui ..................... G06Q 10/10 |
| 6,081,780 A * | 6/2000 | Lumelsky .............. G10L 13/08 704/260 |
| 2002/0002460 A1 * | 1/2002 | Pertrushin ............... G10L 17/26 704/270 |
| 2002/0169610 A1 | 11/2002 | Luegger |
| 2008/0235024 A1 | 9/2008 | Goldberg et al. |
| 2015/0025891 A1 * | 1/2015 | Goldberg .............. G10L 13/033 704/260 |

(Continued)

FOREIGN PATENT DOCUMENTS

DE 19841683 A1 5/2000

*Primary Examiner* — Marcus T Riley
(74) *Attorney, Agent, or Firm* — Pepper Hamilton LLP (57) ABSTRACT

This disclosure relates generally to the text-to-speech synthesis and more particularly to a system and method for rendering textual messages using customized natural voice. In one embodiment, a system for rendering textual messages using customized natural voice, is disclosed, comprising a processor and a memory communicatively coupled to the processor. The memory stores processor instructions, which, on execution, causes the processor to receive present textual messages and at least one of previous textual messages, response to the previous textual messages or receiver's context. The processor further predicts final emotional state of sender's customized natural voice based on an intermediate emotional state and the receiver's context. The processor further synthesizes the sender's customized natural voice based on the predicted final emotional state of the sender's customized natural voice, voice samples and voice parameters associated with the at least one sender.

17 Claims, 3 Drawing Sheets

(56) References Cited

U.S. PATENT DOCUMENTS

2015/0379981 A1* 12/2015 Balasubramanian ........................ G06Q 30/0255 704/260
2018/0286383 A1* 10/2018 Barari ................... G10L 13/027

* cited by examiner

FIG. 3: Example Computer System

SYSTEM AND METHOD FOR RENDERING TEXTUAL MESSAGES USING CUSTOMIZED NATURAL VOICE

This application claims the benefit of Indian Patent Application Serial No. 201741011632, filed Mar. 31, 2017, which is hereby incorporated by reference in its entirety.

FIELD

This disclosure relates generally to the text-to-speech synthesis and more particularly to a system and method for rendering textual messages using customized natural voice.

BACKGROUND

A text-to-speech (TTS) synthesis is beneficial to people with learning disabilities, people who are illiterate, people with visual impairment, and people wishing to multitask. Despite the far-reaching advantages, present TTS synthesis has a great disadvantage. The present TTS synthesis lacks humane touch. This may be because the present TTS synthesis outputs mechanical or automated voice. The automated voice which may be clearly distinguishable from human voice may be annoying to the ears. Another disadvantage of the present TTS synthesis is that, it does not attempt to recreate emotions behind textual messages, for instance emotions behind emoticons are lost in the present TTS synthesis.

Present attempts at creating a natural voice synthesizer fails because they do not take into account emotional context in which these textual messages are sent. The context with which the textual messages are sent, may be gathered from the emotions associated with previous exchange of messages. For instance, emotion associated with a message "Mary is gone" may be understood only after analyzing the emotion associated with the previous message "Mary is in the hospital". Hence, there is a need for an improved system and method for automatically reading out messages of a sender in the sender's natural voice with the appropriate emotion.

SUMMARY

In an embodiment, the present disclosure illustrates a method of rendering one or more present textual messages using customized natural voice of at least one sender. The method comprising receiving the one or more present textual messages from the at least one sender and at least one of one or more previous textual messages from the at least one sender, response to the one or more previous textual messages or receiver's context. The method further comprising predicting final emotional state of sender's customized natural voice based on an intermediate emotional state and the receiver's context, wherein the intermediate emotional state is based on emotions associated with the at least one of the one or more present textual messages, the one or more previous textual messages, the response to the one or more previous textual messages or the receiver of the one or more present textual messages. The method further comprising synthesizing the sender's customized natural voice based on the predicted final emotional state of the sender's customized natural voice, voice samples and voice parameters associated with the at least one sender.

In another embodiment, the present disclosure illustrates a system for rendering one or more present textual messages using customized natural voice of at least one sender. The system comprises a processor and a memory communicatively coupled to the processor. The memory stores processor instructions, which, on execution, causes the processor to receive the one or more present textual messages from the at least one sender and at least one of one or more previous textual messages from the at least one sender, response to the one or more previous textual messages or receiver's context. The processor further predicts final emotional state of sender's customized natural voice based on an intermediate emotional state and the receiver's context, wherein the intermediate emotional state is based on emotions associated with the at least one of the one or more present textual messages, the one or more previous textual messages, the response to the one or more previous textual messages or the receiver of the one or more present textual messages. The processor further synthesizes the sender's customized natural voice based on the predicted final emotional state of the sender's customized natural voice, voice samples and voice parameters associated with the at least one sender.

In yet another embodiment, a non-transitory computer readable storage medium is provided. The storage medium stores a program that, when executed by a computer, cause the computer to perform a method of rendering one or more present textual messages using customized natural voice of at least one sender. The method comprising receiving the one or more present textual messages from the at least one sender and at least one of one or more previous textual messages from the at least one sender, response to the one or more previous textual messages or receiver's context. The method further comprising predicting final emotional state of sender's customized natural voice based on an intermediate emotional state and the receiver's context, wherein the intermediate emotional state is based on emotions associated with the at least one of the one or more present textual messages, the one or more previous textual messages, the response to the one or more previous textual messages or the receiver of the one or more present textual messages. The method further comprising synthesizing the sender's customized natural voice based on the predicted final emotional state of the sender's customized natural voice, voice samples and voice parameters associated with the at least one sender.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses a system and method for rendering textual messages using customized natural voice. The system and method may be implemented in a variety of computing systems.

Figure 1:
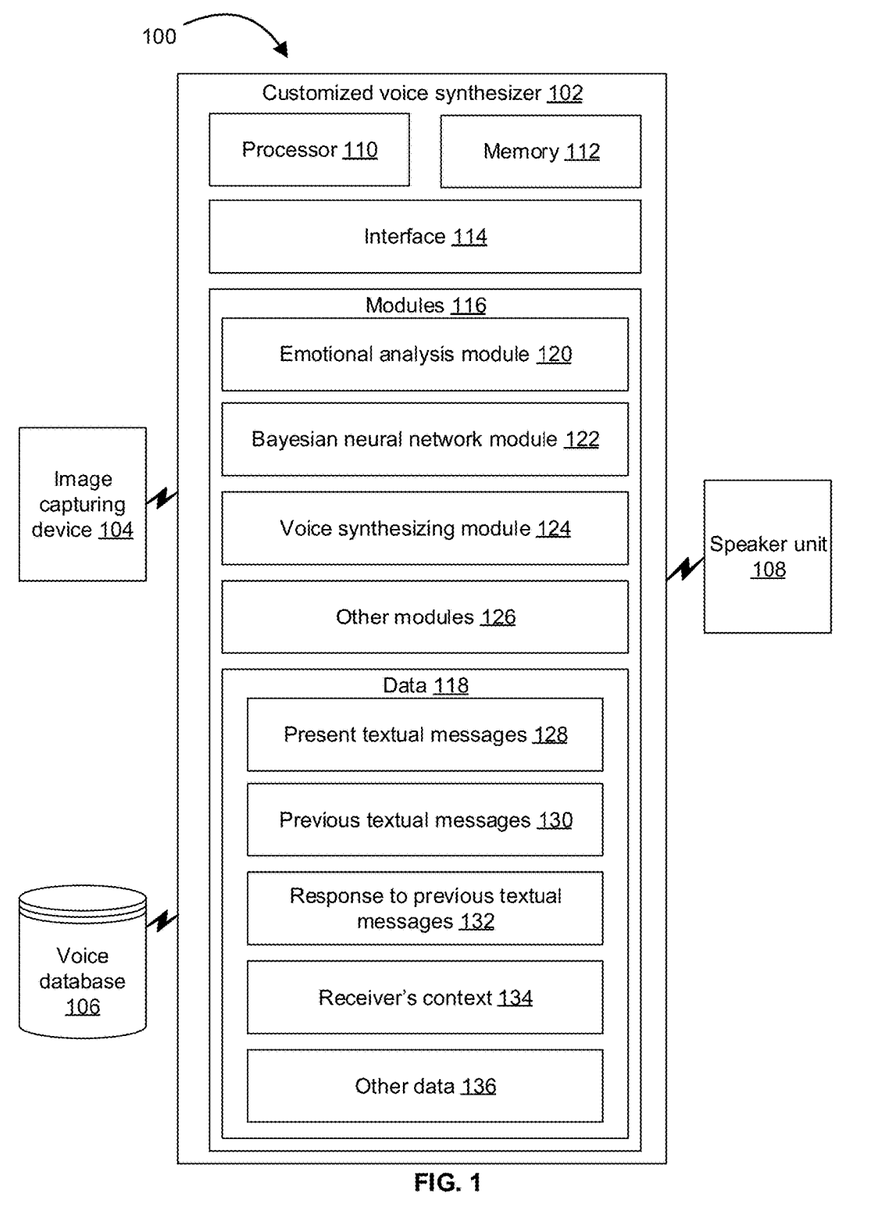
FIG. 1 illustrates an exemplary network implementation comprising a customized voice synthesizer for rendering one or more present textual messages using customized natural voice of at least one sender, according to some embodiments of the present disclosure.
Figure 2:
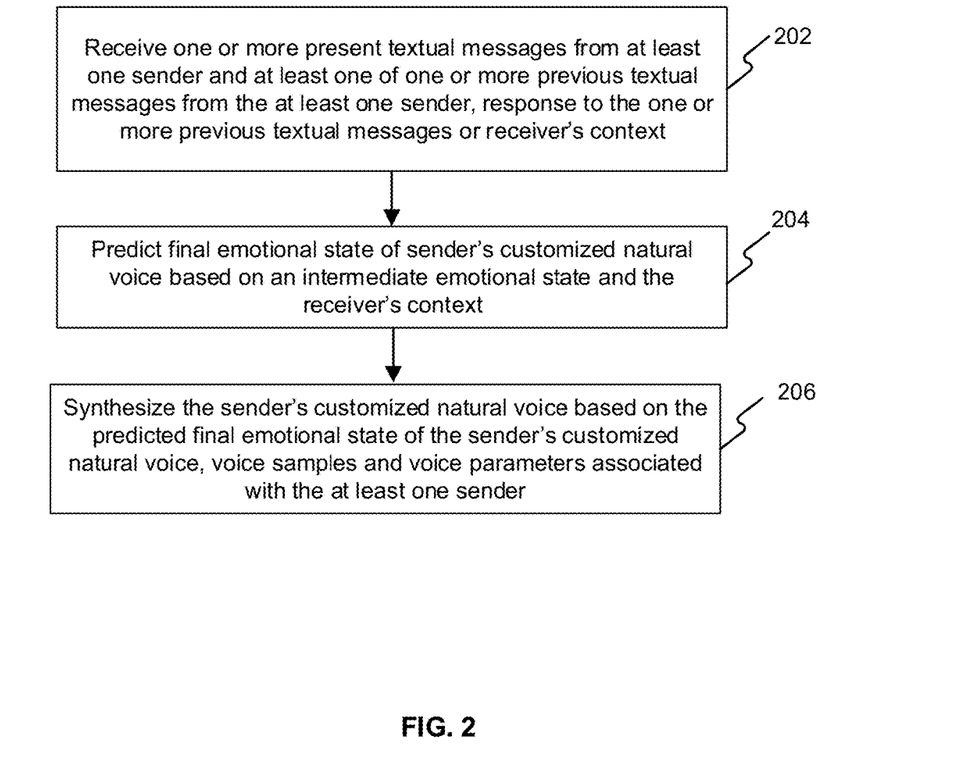
FIG. 2 is a flow diagram illustrating a method of rendering one or more present textual messages using customized natural voice of at least one sender in accordance with some embodiments of the present disclosure.
Figure 3:
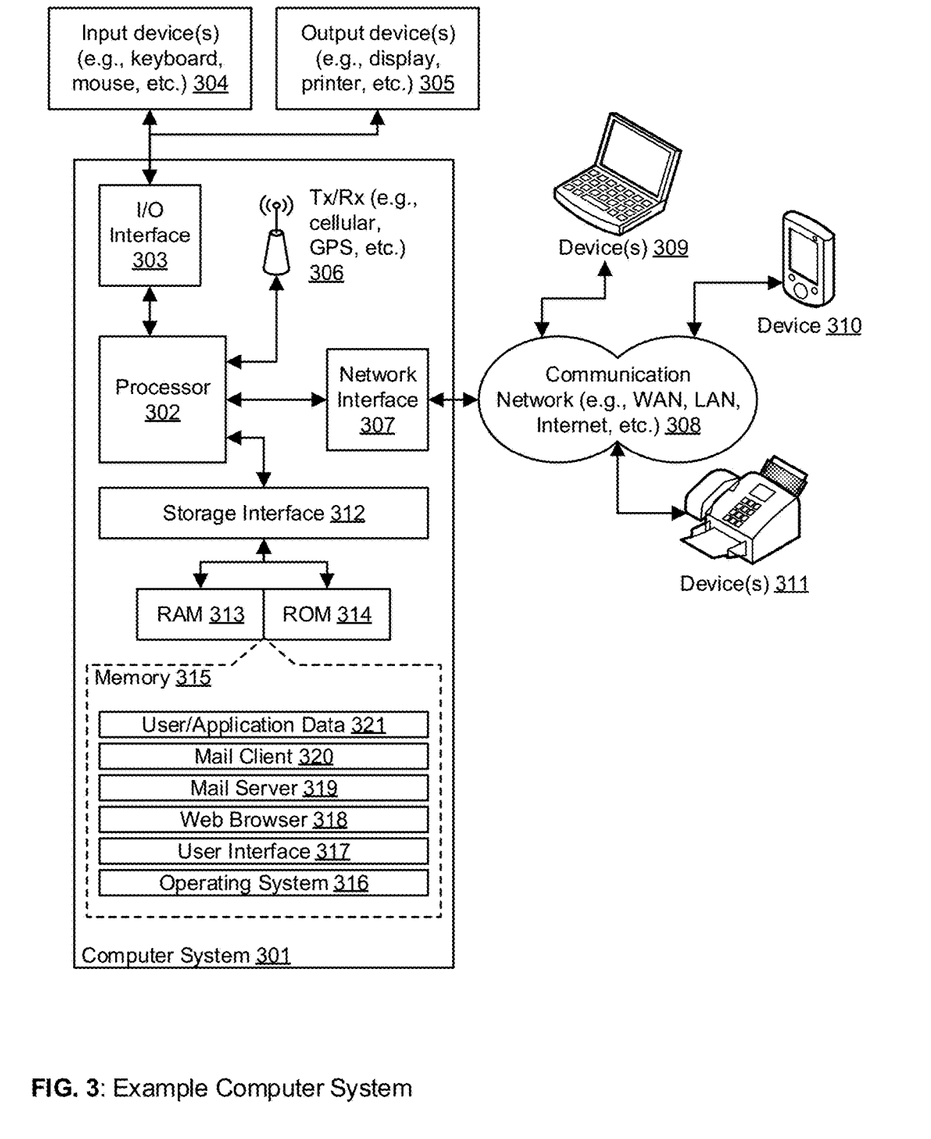
FIG. 3 is a block diagram of an exemplary computer system for implementing embodiments consistent with the present disclosure.

Working of the systems and methods for rendering textual messages using customized natural voice is described in conjunction with FIG. 1-3. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

FIG. 1 illustrates an exemplary network environment 100 comprising a customized voice synthesizer 102, in accordance with some embodiments of the present disclosure. As shown in FIG. 1, the customized voice synthesizer 102 is communicatively coupled to an image capturing device 104, a voice database 106 and a speaker unit 108. The image capturing device 104 may be a mobile phone camera, a video camera or a security camera. The voice database 106 may comprise voice samples and voice parameters. Although, the image capturing device 104, the voice database 106, and the speaker unit 108 is shown external to the customized voice synthesizer 102 in FIG. 1, it may be noted that, in one implementation, the image capturing device 104, the voice database 106 and the speaker unit 108 may be present within the customized voice synthesizer 102.

The customized voice synthesizer 102 may be communicatively coupled to the image capturing device 104, the voice database 106 and the speaker unit 108 through a network. The network may be a wireless network, wired network or a combination thereof. The network can be implemented as one of the different types of networks, such as intranet, local area network (LAN), wide area network (WAN), the internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network may include a variety of network devices, including routers, bridges, servers, computing devices, storage devices, etc.

As shown in FIG. 1, the customized voice synthesizer 102 comprises a processor 110, a memory 112 coupled to the processor 110 and interface(s) 114. The processor 110 may be implemented as one or more microprocessors, microcomputers, microcontrollers, digital signal processors, central processing units, state machines, logic circuitries, and/or any devices that manipulate signals based on operational instructions. Among other capabilities, the processor 110 is configured to fetch and execute computer-readable instructions stored in the memory 112. The memory 112 can include any non-transitory computer-readable medium known in the art including, for example, volatile memory (e.g., RAM), and/or non-volatile memory (e.g., EPROM, flash memory, etc.).

The interface(s) 114 may include a variety of software and hardware interfaces, for example, a web interface, a graphical user interface, etc., allowing the customized voice synthesizer 102 to interact with user devices. Further, the interface(s) 114 may enable the customized voice synthesizer 102 respectively to communicate with other computing devices. The interface(s) 114 can facilitate multiple communications within a wide variety of networks and protocol types, including wired networks, for example LAN, cable, etc., and wireless networks such as WLAN, cellular, or satellite. The interface(s) 114 may include one or more ports for connecting a number of devices to each other or to another server.

In one example, the customized voice synthesizer 102 includes modules 116 and data 118. In one embodiment, the modules 116 and the data 118 may be stored within the memory 112. In one example, the modules 116, amongst other things, include routines, programs, objects, components, and data structures, which perform particular tasks or implement particular abstract datatypes.

In one implementation, the modules 116 include an emotional analysis module 120, a Bayesian neural network module 122 and a voice synthesizing module 124. In an example, the modules 116 may also comprise other modules 126. The other modules 126 may perform various miscellaneous functionalities of the customized voice synthesizer 102. It will be appreciated that such aforementioned modules may be represented as a single module or a combination of different modules.

In one example, the data 118 serves, among other things, as a repository for storing data fetched, processed, received and generated by one or more of the modules 116. In one implementation, the data 118 may include present textual messages 128, previous textual messages 130, response to the previous textual messages 132 and receiver's context 134. The receiver's context 134 may include receiver's location, receiver's state, receiver's health condition and receiver's preferences. In one embodiment, the data 118 may be stored in the memory 112 in the form of various data structures. In an example, the data 118 may also comprise other data 136 including temporary data and temporary files, generated by the modules 116 for performing the various functions of the customized voice synthesizer 102.

In order to render present textual messages 128 using customized natural voice 102 of at least one sender, the customized voice synthesizer 102 may receive the present textual messages 128, the previous textual messages 130, response to the previous textual messages 132 and the receiver's context 134. The customized voice synthesizer 102 may be incorporated in smart phones, wearable devices, computers, laptops, Personal Digital Assistants (PDA) or other devices that may be used for reading out books and articles. In one embodiment, the customized voice synthesizer 102 may be incorporated in the mobile phone of the receiver. The customized voice synthesizer 102 may receive the present textual messages 128 from the sender's mobile phone. In one embodiment, the customized voice synthesizer 102 may receive the previous textual messages 130 and response to the previous textual messages 132 from backup data of the mobile phone of the receiver. The receiver's context 134 may include the receiver's location, the receiver's state, the receiver's health condition and the receiver's preferences. The receiver's context 134 may be gathered from public domain data and social websites.

After receiving the present textual messages 128, the previous textual messages 130, the response to the previous textual messages 132 and the receiver's context 134, final emotional state of sender's customized natural voice may be predicted based on an intermediate emotional state and the receiver's context 134. The intermediate emotional state may include emotions linked with the present textual messages 128, the previous textual messages 130 and the response to the previous textual messages 132. In one embodiment, the emotions linked with the present textual messages 128, the previous textual messages 130 and the response to the previous textual messages 132 may be determined using natural language processing.

The intermediate emotional state may also include the emotions of the receiver of the present textual messages 128. In one embodiment, the emotions of the receiver, may be determined using emotion recognition Application Programming Interface (API). The emotion recognition APIs may use facial detection, eye tracking and specific facial position cues to determine emotions of the receiver. The intermediate emotional state may be determined by the emotional analysis module 120.

Predicting the final emotional state of the sender's customized natural voice is a three-step process. The first step is to determine an intermediate emotional vector. The intermediate emotional vector is the intermediate emotional state, when the intermediate emotional state is expressed as a vector. For instance, the emotional vector associated with the message "Who are you to ask about my exams?" may be 70% anger, 20% fear and 10% sadness. The intermediate emotions may be expressed using the emotions such as anger, contempt, fear, disgust, happiness, neutral, sadness, surprise, obedience and arrogance. In one embodiment, an emotional vector associated with an anticipated emotion corresponding to response to the previous textual messages 132 may be determined using deep learning techniques. This may also be used to predict the final emotional state of the sender's customized voice.

The second step in predicting the final emotional state of the sender's customized natural voice may be to assign weightages to the intermediate emotional vector and the receiver's context 134. In one embodiment, weightage assigned to the emotional vector associated with the present textual messages 128 may be a high value. In one illustration, the assigned weightage may be one. In one embodiment, weightage assigned to the previous textual messages 130 may be a high value when the time lapse between the receiving of the previous textual message 130 and receiving of the present textual message 128 is low. In one illustration, weightage assigned to the previous textual message 130 may be one, when the time lapse between receiving the previous textual message 130 and receiving the present textual message 128 is 5 minutes. In another illustration, when the time lapse is 24 hours, the weightage may be 0.5.

In one embodiment, weightage assigned to the receiver's emotional vector may depend on valence of emotion associated with the receiver and the present textual message 128. In one embodiment, if there is a positive valence associated with the emotions of the receiver and there is positive valence associated with the present textual messages 128, then a high value of weightage may be assigned to the emotional vector of the receiver. In another embodiment, when there is negative valence associated with the receiver and there is negative valence associated with the present textual message 128, then a low weightage may be assigned to the emotional vector associated with the receiver. In one illustration, when the receiver is angry and the overall tone of the message is anger, then this might further agitate the receiver. Hence, it might be better to read out the angry message in a neutral tone.

In one embodiment, assigning of weightage to the receiver's context 134 may be based on the receiver's location, the receiver's state, the receiver's health condition and the receiver's preferences. In one illustration, the receiver may be in a temple. In the same illustration, a message to the receiver "Where are we partying today" may be tactfully read out at a later point of time, after the customized voice synthesizer 102 comprehends the receiver's location and the content of the present textual message 128. The same message may be read out in a tone of happiness when the receiver's location is different. In another illustration, the receiver may be a cardiac patient. In the same illustration, the messages with negative valence of emotion attached to it, may be read out in a neutral tone. In another illustration, the receiver may be a yogi and may prefer hearing all messages in the neutral tone. These data about the receiver may be inferred from data gathered from the social websites and the public domain. In another illustration, the receiver may be driving a vehicle at top speed. A message such as "Your father is in the hospital" should not be read out with sadness and urgency. In the same illustration, the customized voice synthesizer 102 may comprehend the receiver's state and the content of the present textual message 128 and hence the message may be read out in a neutral tone. This may ensure the safety of the receiver.

The third step is predicting the final emotional vector from the intermediate emotional vector and the weightages. The final emotional vector is the final emotional state expressed as a vector. Predicting the final emotional vector may be done using a Bayesian neural network module 122. The Bayesian neural network module 122 learns all the rules associated with the emotional vectors of the present textual messages 128, the previous textual messages 130, response to the previous textual messages 132 and the receiver. The Bayesian neural network module 122 may also learn the rules governing the receiver's context 134. In one embodiment, the predicted final emotional vector may consist of a mix of the emotions such as anger, fear etc. In another embodiment, the predicted final emotional vector may include only the dominant emotion.

In one illustration, the exchange of messages may be as follows. "Please work hard for the exams". "Who are you to advise me?". "I am your father". The present textual message 128 may be "I am your father". "Please work hard for the exams" may be the previous textual messages 130 and "Who are you to advise me" may be the response to the previous textual messages 132. In the same illustration, the emotional vector of the present textual message 128 may be neutral 80%, happy 10%, angry 8%, fear 2%. The emotional vector of the previous message 130 may be neutral 60%, sad 30%, fear 10%. The emotional vector of the response to previous message 132 may be arrogance 50%, sad 20%, angry 20% and fear 10%. The emotional vector associated with the anticipated emotion in response may be angry 80%, sad 10% and fear 10%. In the same illustration, the predicted final emotional vector may be angry 70%, sad 20% and fear 10%. It may be noted that the predicted final emotional vector is different from the emotional vector of the present textual messages 128.

After predicting the final emotional state of the sender's customized natural voice, the sender's customized natural voice may be synthesized, based on the predicted final emotional state of the sender's customized natural voice, the voice samples and the voice parameters, using the voice synthesizing module 124. The voice samples and the voice parameters may be extracted from the voice database 106. The voice database 106 may include the voice samples and the corresponding voice parameters of the senders. In one embodiment, the senders may be unknown. In this situation, the customized voice synthesizer 102 may urge the unknown sender to share a voice clip. If the unknown sender refuses, then a default voice may be assigned to the message of the unknown sender. In another embodiment, the message may be an automated message such as public service messages, advertisements, offers and bank account updates. In this situation, the automated messages may be classified based on content of the message. Each classification may be associated with a particular voice or tone. The voice for each classification may be decided by the receiver or by the OEM (Original Equipment Manufacturer). In one illustration, the automated message may be from the law enforcement agencies, in which case an authoritative tone would be chosen from a library of voices from the voice database 106. In another illustration, an advertisement for promoting a particular brand of tooth paste may be read out in the tone of the receiver's favorite actor. The receiver's favorite actor may be gathered from the social media or the public domain. The voice database 106 may also include the default voice for the automated messages and the unknown senders, who refuses to share the voice clips.

The voice database 106 may be populated with the voice samples from voice calls with the receiver, audio clips in the receiver's mobile phone, video clips in the receiver's mobile phone, social websites, public domains and previously built databases. The voice parameters may be determined from the voice samples using voice analysis technology. The voice parameters may include pitch, rate, quality of voice, amplitude, style of speaking, tone, user's pronunciation, prosody and pause taken in between each sentence.

In one embodiment, synthesizing the sender's customized natural voice may be done by initially using a text-to-speech synthesis to convert the present textual message 128 to a standard voice. In the same embodiment, morphing may be done to synthesize the standard voice to the voice sample corresponding to the sender. The voice parameters and the final emotional vector may be incorporated in the morphed voice, thus synthesizing the sender's customized natural voice.

In another embodiment, synthesizing the sender's customized natural voice may be done by initially training a deep neural network with the voice samples of the sender. After training the deep neural network with many voice samples of the same sender, the deep neural network may be able to predict the voice of the sender for the present textual message 128 and for a particular predicted final emotional vector. In one embodiment, the deep neural network used may be a recurrent neural network. After synthesizing the sender's customized natural voice, the synthesized voice is rendered in audio form using the speaker unit 108.

In one embodiment, the customized voice synthesizer 102 may provide a summarized version of the present textual message 128 to the receiver in the sender's customized natural voice. For instance, an automated message from a bank informing the receiver of his credit options may be reduced from a 7 sentence textual message to a 2 sentence audio message.

In one embodiment, the realistic feel of final voice output may be enhanced by including background noises that are linked to the present textual message 128. For instance, a message "I am in a market and it is raining", may trigger the customized voice synthesizer 102 to output a voice output with the background noises of the market and the rain. In another embodiment, the background noises in the voice sample may be incorporated in the final voice output. In another embodiment, each sender may be associated with a particular background noise.

In one embodiment, there may be more than one sender associated with the same message. For instance, "We wish you a Merry Christmas—From John and Mary". The same message wishing Merry Xmas has two senders namely John and Mary. In this situation, the final emotional vector may be same for both the senders. In the same embodiment, both the voices, which has the voice parameters and the final emotional vector incorporated in it, may be played together to give the feeling to the receiver that the senders are together and that they are wishing the receiver "Merry Christmas".

FIG. 2 is a flow diagram illustrating a method of rendering one or more present textual messages 128 using customized natural voice of at least one sender. With reference to FIG. 2, present textual messages 128, previous textual messages 130, response to the previous textual messages 132 and receiver's context 134, may be received at step 202. In one embodiment, the present textual messages 128 may be received by a mobile phone of a receiver from a sender's mobile phone. In one embodiment, the previous textual messages 130 and the response to the previous textual messages 132 may be received from backup data of the receiver's mobile phone. Receiver's context 134 may include receiver's location, receiver's state, receiver's health condition and receiver's preferences. Receiver's context 134 may be gathered from public domain data and social websites.

After receiving the present textual messages 128, the previous textual messages 130, the response to the previous textual messages 132 and the receiver's context 134, a final emotional state of the sender's customized natural voice may be predicted based on an intermediate emotional state and the receiver's context 134, at step 204. The intermediate emotional state may include emotions linked with the present textual messages 128, the previous textual messages 130 and the response to the previous textual messages 132. In one embodiment, the emotions linked with the present textual messages 128, the previous textual messages 130 and the response to the previous textual messages 132 may be determined using natural language processing.

The intermediate emotional state may also include the emotions of the receiver of the present textual messages 128. In one embodiment, the emotions of the receiver, may be determined using emotion recognition Application Programming Interface (API). The emotion recognition APIs may use facial detection, eye tracking and specific facial position cues to determine emotions of the receiver.

Predicting the final emotional state of the sender's customized natural voice is a three-step process. The first step is to determine an intermediate emotional vector. The intermediate emotional vector is the intermediate emotional state, when the intermediate emotional state is expressed as a vector. For instance, the emotional vector associated with the message "Who are you to ask about my exams?" may be 70% anger, 20% fear and 10% sadness. The intermediate emotional vector may be expressed using the emotions such as anger, contempt, fear, disgust, happiness, neutral, sadness, surprise, obedience and arrogance. In one embodiment, an emotional vector associated with an anticipated emotion corresponding to response to the previous textual messages may be determined using deep learning techniques. This may also be used to predict the final emotional state of the sender's customized voice.

The second step in predicting the final emotional state of the sender's customized natural voice may be to assign weightages to the intermediate emotional vector and the receiver's context 134. In one embodiment, weightage assigned to the emotional vector associated with the present textual messages 128 may be a high value. In one illustration, the assigned weightage may be one. In one embodiment, the weightage assigned to the previous textual messages 130 may be a high value when the time lapse between the receiving of the previous textual message 130 and receiving of the present textual message 128 is low. In one illustration, weightage assigned to the previous textual message 130 may be one, when the time lapse between receiving the previous textual message 130 and receiving the present textual message 128 is 5 minutes. In another illustration, when the time lapse is 24 hours, the weightage may be 0.5.

In one embodiment, weightage assigned to the receiver's emotional vector may depend on valence of emotion associated with the receiver and the present textual message 128. In one embodiment, if there is a positive valence of emotion associated with the receiver and there is positive valence of emotion associated with the present textual message 128, then a high value of weightage may be assigned to the emotional vector of the receiver. In another embodiment, when there is negative valence of emotion associated with the receiver and there is negative valence of emotion associated with the present textual message 128, then a low weightage may be assigned to the emotional vector associated with the receiver. In one illustration, when the receiver is angry and the overall tone of the message is anger, then this might further agitate the receiver. Hence, it might be better to read out the angry message in a neutral tone.

In one embodiment, assigning of weightage to the receiver's context may be based on the receiver's location, the receiver's state, the receiver's health condition and the receiver's preferences. In one illustration, the receiver may be in a temple. In the same illustration, a message to the receiver "Where are we partying today" may be tactfully read out at a later point of time, after comprehending the receiver's location and the content of the present textual message 128. The same message may be read out in a tone of happiness when the receiver's location is different. In another illustration, the receiver may be a cardiac patient. In the same illustration, the messages with negative valence of emotion attached to it, may be read out in a neutral tone. In another illustration, the receiver may be a yogi and may prefer hearing all messages in the neutral tone. These data about the receiver may be inferred from data gathered from the social websites and the public domain. In another illustration, the receiver may be driving a vehicle at top speed. A message such as "Your father is in the hospital" should not be read out with sadness and urgency. In the same illustration, after comprehending the receiver's state and the content of the message, the message may be read out in the neutral tone. This may ensure the safety of the receiver.

The third step is predicting the final emotional vector from the intermediate emotional vector and the weightages. The final emotional vector is the final emotional state expressed as a vector. Predicting the final emotional vector may be done using a Bayesian neural network. The Bayesian neural network learns all the rules associated with the emotional vectors of the present textual messages 128, the previous textual messages 130, response to the previous textual messages 132 and the receiver. The Bayesian neural network may also learn the rules governing the receiver's context 134. In one embodiment, the predicted final emotional vector may consist of a mix of the emotions such as anger, fear etc. In another embodiment, the predicted final emotional vector may include only the dominant emotion.

In one illustration, the exchange of messages may be as follows. "Please work hard for the exams". "Who are you to advise me?". "I am your father". The present textual message 128 may be "I am your father". "Please work hard for the exams" may be the previous textual message 130 and "Who are you to advise me" may be the response to the previous textual message 132. In the same illustration, the emotional vector of the present textual message 128 may be neutral 80%, happy 10%, angry 8%, fear 2%. The emotional vector of the previous textual message 130 may be neutral 60%, sad 30%, fear 10%. The emotional vector of the response to the previous textual message may be arrogance 50%, sad 20%, angry 20% and fear 10%. The emotional vector associated with the anticipated emotion in response may be angry 80%, sad 10% and fear 10%. In the same illustration, the predicted final emotional vector, that is predicted by the Bayesian neural network may be angry 70%, sad 20% and fear 10%. It may be noted that the predicted final emotional vector is different from the emotional vector of the present textual messages 128.

After predicting the final emotional state of the sender's customized natural voice, the sender's customized natural voice may be synthesized, based on the predicted final emotional state of the sender's customized natural voice, the voice samples and the voice parameters, at step 206. The voice samples and the voice parameters may be extracted from the voice database 106. The voice database 106 may include the voice samples and the corresponding voice parameters of the senders. In one embodiment, the senders may be unknown. In this situation, the unknown sender may be urged to share a voice clip. If the unknown sender refuses, then a default voice may be assigned to the message of the unknown sender. In another embodiment, the message may be an automated message such as public service messages, advertisements, offers and bank account updates. In this situation, the automated message may be classified based on content of the message. Each classification may be associated with a particular voice or tone. The voice for each classification may be decided by the receiver or by the OEM (Original Equipment Manufacturer). In one illustration, the automated message may be from the law enforcement agencies, in which case an authoritative tone would be chosen from a library of voices from the voice database 106. In another illustration, an advertisement for promoting a particular brand of tooth paste may be read out in the tone of the receiver's favorite actor. The receiver's favorite actor may be gathered from the social media or the public domain. The voice database 106 may also include the default voice for the automated messages and the unknown senders, who refuses to share the voice clips.

The voice database 106 may be populated with the voice samples from voice calls with the receiver, audio clips in the receiver's mobile phone, video clips in the receiver's mobile phone, social websites, public domains and previously built databases. The voice parameters may be determined from the voice samples using voice analysis technology. The voice parameters may include pitch, rate, quality of voice, amplitude, style of speaking, tone, user's pronunciation, prosody and pause taken in between each sentences.

In one embodiment, synthesizing the sender's customized natural voice may be done by initially using a text-to-speech synthesis to convert the present textual message 128 to a standard voice. In the same embodiment, morphing may be done to synthesize the standard voice to the voice sample corresponding to the sender. The voice parameters and the final emotional vector may be incorporated in the morphed voice, thus synthesizing the sender's customized natural voice.

In another embodiment, synthesizing the sender's customized natural voice may be done by initially training a deep neural network with the voice samples of the sender. After training the deep neural network with many voice samples of the same sender, the deep neural network may be able to predict the voice of the sender for the present textual message 128 and for a particular predicted final emotional vector. In one embodiment, the deep neural network used may be a recurrent neural network.

In one embodiment, a summarized version of the present textual message 128 may be made available to the receiver in the sender's customized natural voice. For instance, an automated message from a bank informing the receiver of his credit options may be reduced from a 7 sentence textual message to a 2 sentence audio message. The amount of summarization may be based on either the content of the message or the receiver's preferences.

In one embodiment, the realistic feel of final voice output may be enhanced by including background noises that are linked to the present textual message 128. For instance, a message "I am in a market and it is raining", may trigger a voice output with the background noises of the market and the rain. In another embodiment, the background noises in the voice sample may be incorporated in the final voice output. In another embodiment, each sender may be associated with a particular background noise.

In one embodiment, there may be more than one sender associated with the same message. For instance, "We wish you a Merry Christmas—From John and Mary". The same message wishing Merry Xmas has two senders namely John and Mary. In this situation, the final emotional vector may be same for both the senders. In the same embodiment, both the voices, which has the voice parameters and final emotional vector incorporated in it, may be played together to give the feeling to the receiver that the senders are together and that they are wishing the receiver "Merry Christmas"

Computer System

FIG. 3 is a block diagram of an exemplary computer system for implementing embodiments consistent with the present disclosure. Variations of computer system 301 may be used for implementing the customized voice synthesizer. Computer system 301 may comprise a central processing unit ("CPU" or "processor") 302. Processor 302 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 302 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the computer system 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 302. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the computer system 301 may communicate with devices 310, 311, These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 301 may itself embody one or more of these devices.

In some embodiments, the processor 302 may be disposed in communication with one or more memory devices (e.g., RAM 313, ROM 314, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 316, user interface application 317, web browser 318, mail server 319, mail client 320, user/application data 321 (e.g., any data variables or data records discussed in this disclosure), etc. The operating system 316 may facilitate resource management and operation of the computer system 301. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 301 may implement a web browser 318 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 301 may implement a mail server 319 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 301 may store user/application data 321, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described application title. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of rendering one or more present textual messages using customized natural voice of at least one sender, the method comprising:

receiving, by a customized voice synthesizer, the one or more present textual messages from the at least one sender and at least one of one or more previous textual messages from the at least one sender, response to the one or more previous textual messages or receiver's context;

predicting, by the customized voice synthesizer, final emotional state of sender's customized natural voice based on an intermediate emotional state and the receiver's context, wherein the intermediate emotional state is based on emotions associated with the at least one of the one or more present textual messages, the one or more previous textual messages, the response to the one or more previous textual messages or the receiver of the one or more present textual messages, wherein the predicting the final emotional state of sender's customized natural voice comprises:

determining, by a deep neural network, an intermediate emotional vector that is associated with the intermediate emotional state;

assigning, by the deep neural network, weightages to the intermediate emotional vector and the receiver's context based on at least one of time lapse between receiving the one or more previous textual messages and receiving the one or more present textual messages, time lapse between receiving the response to the one or more previous textual messages and receiving the one or more present textual messages, overall emotion associated with the one or more present textual messages or the receiver associated with the one or more present textual messages; and predicting, by the deep neural network, a final emotional vector based on the intermediate emotional vector and the weightages, wherein the final emotional vector is associated with the final emotional state of sender's customized natural voice; and synthesizing, by the customized voice synthesizer, the sender's customized natural voice based on the predicted final emotional state of the sender's customized natural voice, voice samples and voice parameters associated with the at least one sender.

2. The method as claimed in claim 1, further comprising generating a voice dataset, wherein the voice dataset comprises at least one of the voice parameters or the voice samples associated with the at least one sender.

3. The method as claimed in claim 2, wherein the voice samples is determined from at least one of voice calls, videos, audios, social sites, public domains or previously built databases.

4. The method as claimed in claim 1, wherein the voice parameters comprise at least one of pitch, rate, quality of voice, amplitude, style of speaking, tone, user's pronunciation, prosody or pause taken in between each sentences.

5. The method as claimed in claim 1, wherein the receiver's context comprises at least one of receiver's location, receiver's state, receiver's health condition or receiver's preferences.

6. The method as claimed in claim 1, further comprising summarizing the one or more present textual messages based on at least one of content of the one or more present textual messages and the receiver's preferences.

7. The method as claimed in claim 1, wherein the final emotional state of sender's customized natural voice is predicted using deep learning techniques.

8. The method as claimed in claim 1, wherein synthesizing the customized natural voice is done using deep learning techniques.

9. A system for rendering one or more present textual messages using customized natural voice of at least one sender, the system comprising:

a processor;

a memory communicatively coupled to the processor, wherein the memory stores processor-executable instructions, which, on execution, causes the processor to:

receive the one or more present textual messages from the at least one sender and at least one of one or more previous textual messages from the at least one sender, response to the one or more previous textual messages or receiver's context;

predict final emotional state of sender's customized natural voice based on an intermediate emotional state and the receiver's context, wherein the intermediate emotional state is based on emotions associated with at least one of the one or more present textual messages, the one or more previous textual messages, the response to the one or more previous textual messages or the receiver of the one or more present textual messages by, determining an intermediate emotional vector that is associated with the intermediate emotional state;

assigning weightages to the intermediate emotional vector and the receiver's context based on at least one of time lapse between receiving the one or more previous textual messages and receiving the one or more present textual messages, time lapse between receiving the response to the one or more previous textual messages and receiving the one or more present textual messages, overall emotion associated with the one or more present textual messages or the receiver associated with the one or more present textual messages; and predicting a final emotional vector based on the intermediate emotional vector and the weightages, wherein the final emotional vector is associated with the final emotional state of sender's customized natural voice; and synthesize the sender's customized natural voice based on the predicted final emotional state of sender's customized natural voice, voice samples and voice parameters associated with the at least one sender.

10. The system as claimed in claim 9, wherein the memory stores further processor-executable instructions, which, on execution, causes the processor to generate a voice dataset, wherein the voice dataset comprises at least one of the voice parameters or the voice samples associated with the at least one sender.

11. The system as claimed in claim 10, wherein the voice samples is determined from at least one of voice calls, videos, audios, social sites, public domains or previously built databases.

12. The system as claimed in claim 9, wherein the voice parameters comprise at least one of pitch, rate, quality of voice, amplitude, style of speaking, tone, user's pronunciation, prosody or pause taken in between each sentences.

13. The system as claimed in claim 9, wherein the receiver's context comprises at least one of receiver's location, receiver's state, receiver's health condition or receiver's preferences.

14. The system as claimed in claim 9, wherein the memory stores further processor-executable instructions, which, on execution, causes the processor to summarize the one or more present textual messages based on at least one of content of the one or more present textual messages or the receiver's preferences.

15. The system as claimed in claim 9, wherein the final emotional state of sender's customized natural voice is predicted using deep learning techniques.

16. The system as claimed in claim 9, wherein synthesizing the customized natural voice is done using deep learning techniques.

17. A non-transitory computer readable storage medium storing a program that, when executed by a computer, cause the computer to perform a method of rendering one or more present textual messages using customized natural voice of at least one sender, the method comprising:

receiving the one or more present textual messages from the at least one sender and at least one of one or more previous textual messages from the at least one sender, response to the one or more previous textual messages or receiver's context;

predicting final emotional state of sender's customized natural voice based on an intermediate emotional state and the receiver's context, wherein the intermediate emotional state is based on emotions associated with the at least one of the one or more present textual messages, the one or more previous textual messages, the response to the one or more previous textual messages or the receiver of the one or more present textual messages by,
- determining an intermediate emotional vector that is associated with the intermediate emotional state;
- assigning weightages to the intermediate emotional vector and the receiver's context based on at least one of time lapse between receiving the one or more previous textual messages and receiving the one or more present textual messages, time lapse between receiving the response to the one or more previous textual messages and receiving the one or more present textual messages, overall emotion associated with the one or more present textual messages or the receiver associated with the one or more present textual messages; and
- predicting a final emotional vector based on the intermediate emotional vector and the weightages, wherein the final emotional vector is associated with the final emotional state of sender's customized natural voice; and
- synthesizing the sender's customized natural voice based on the predicted final emotional state of sender's customized natural voice, voice samples and voice parameters associated with the at least one sender.

\* \* \* \* \*